Figure 1:
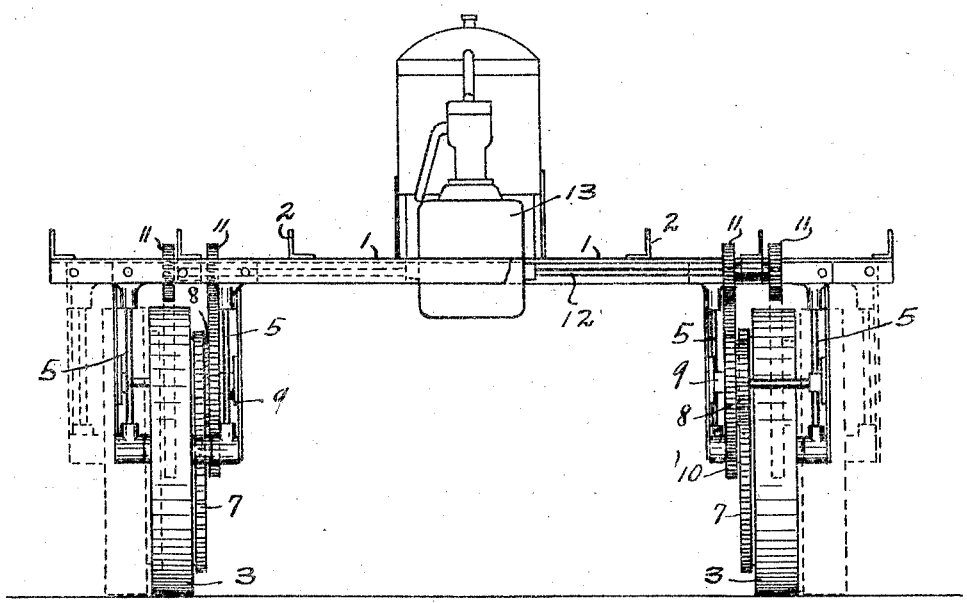

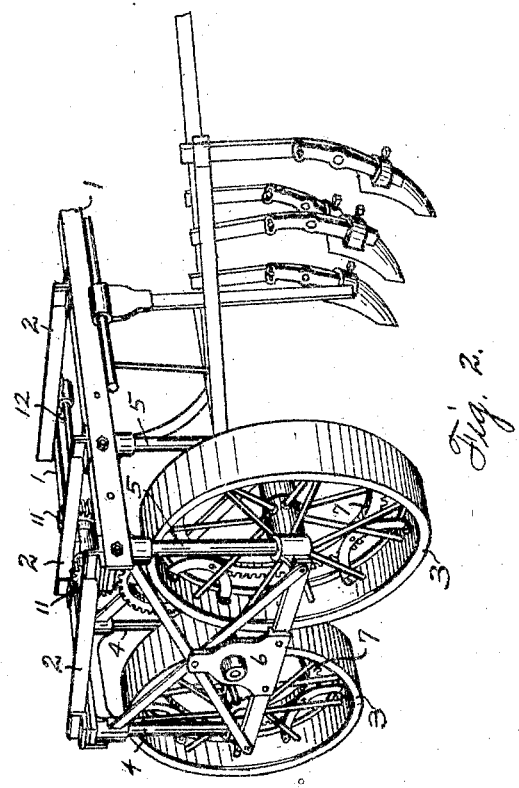

UNITED STATES PATENT OFFICE.

WILLIAM S. WEAVER, OF HOUSTON, TEXAS.

TRACTOR.

1,334,475.  Specification of Letters Patent.  Patented Mar. 23, 1920.

Application filed June 21, 1919. Serial No. 305,865.

*To all whom it may concern:*

Be it known that I, WILLIAM S. WEAVER, a citizen of the United States, residing at Houston, in the county of Harris and State of Texas, have invented certain new and useful Improvements in Tractors, of which the following is a specification.

This invention relates to new and useful improvements in tractors.

One object of the invention is to provide a tractor of the character described, embodying a supporting framework, and tractor wheels, whereon the same is mounted, said tractor wheels being adjustable on the framework, toward and from each other, so as to give a wide or a narrow tread as may be desired. In some character of work, it is desirable that the tractor wheels be spaced farther apart, and in other characters of work, it is desirable that they be closer together. For that reason, the tractor herein described has its supporting wheels adjustable on the framework for the purpose described.

Another object of the invention is to provide a tractor of the character described, whose supporting wheels may be adjusted relative to the framework, to vary their distance apart, and so arranged that when in either position, they will be operatively connected with the driving shaft through which rotation is imparted to them from the motor.

With the above and other objects in view, the invention has particular relation to certain novel features of construction, arrangement of parts and use, an example of which is given in this specification and illustrated in the accompanying drawings, wherein:

Figure 1, shows a rear view with certain conventional parts removed for the sake of clearness, and Fig. 2 is an enlarged fragmentary perspective view.

Referring now more particularly to the drawings wherein like numerals of reference designate similar parts in each of the figures, the numerals 1, 1, designate the front and rear side members of the supporting frame, which are connected by the transverse connecting bars 2. This framework is supported at each side by means of the tractor wheels 3, 3, there being two of said wheels at each side. Bolted to the front and rear side members, 1, 1, respectively, are brackets, consisting of the front and rear posts 4, 4, and 5, 5, between which the corresponding tractor wheels are rotatably mounted, said front and rear posts being suitably anchored together by means of braces 6. These posts are bolted at their upper ends to the respective side members, 1, and are adjustable thereon. Secured to the spokes of each tractor wheel on the inner side, there is an annular spur gear 7, which gears are in mesh with corresponding spur gears 8, which are fixed upon the short shafts 9, 9, and also fixed upon said shafts 9, are the spur gears 10, which are arranged to mesh with either of the spur gears 11, 11, fixed upon the transverse drive shaft 12. This drive shaft is operatively connected with and driven by the motor 13. A plurality of spur gears 11 are fixed upon each end of the countershaft 12, so that to whatever position the tractor wheels may be adjusted, the spur gears 10 will be in mesh with one or the other of said gears 11. The brackets wherein the tractor wheels are mounted on each side are independent units, and said brackets, tractor wheels, and the gearing through which said tractor wheels are rotated, from the gears 11, may be adjusted back and forth relative to the framework, by removing the securing bolts by means of which said brackets are secured to the framework, and adjusting the brackets to the desired point and then replacing said bolts.

What I claim is:

1. A tractor including a supporting framework, a bracket adjustably secured thereto at each side, a pair of tractor wheels mounted in each bracket, a train of gears through which each pair of tractor wheels may be driven, a drive shaft in operative connection with each train of gears, at any point of adjustment of the tractor wheels, relative to the framework.

2. A tractor including a framework, a pair of tractor wheels, supporting said framework at each side, said pairs being adjustable toward and from each other on the framework, a drive shaft, a train of gears operatively connected with and provided to drive each pair of tractor wheels, and gears on said drive shaft, one of which is in mesh with the corresponding train of gears at any point of adjustment of the tractor wheels.

In testimony whereof I have signed my name to this specification in the presence of two subscribing witnesses.

WILLIAM S. WEAVER.

Witnesses:
 IRENE BRUNS,
 WM. A. CATHEY